May 10, 1927.
J. R. ROSE
GASEOUS FUEL
Filed Dec. 31, 1919
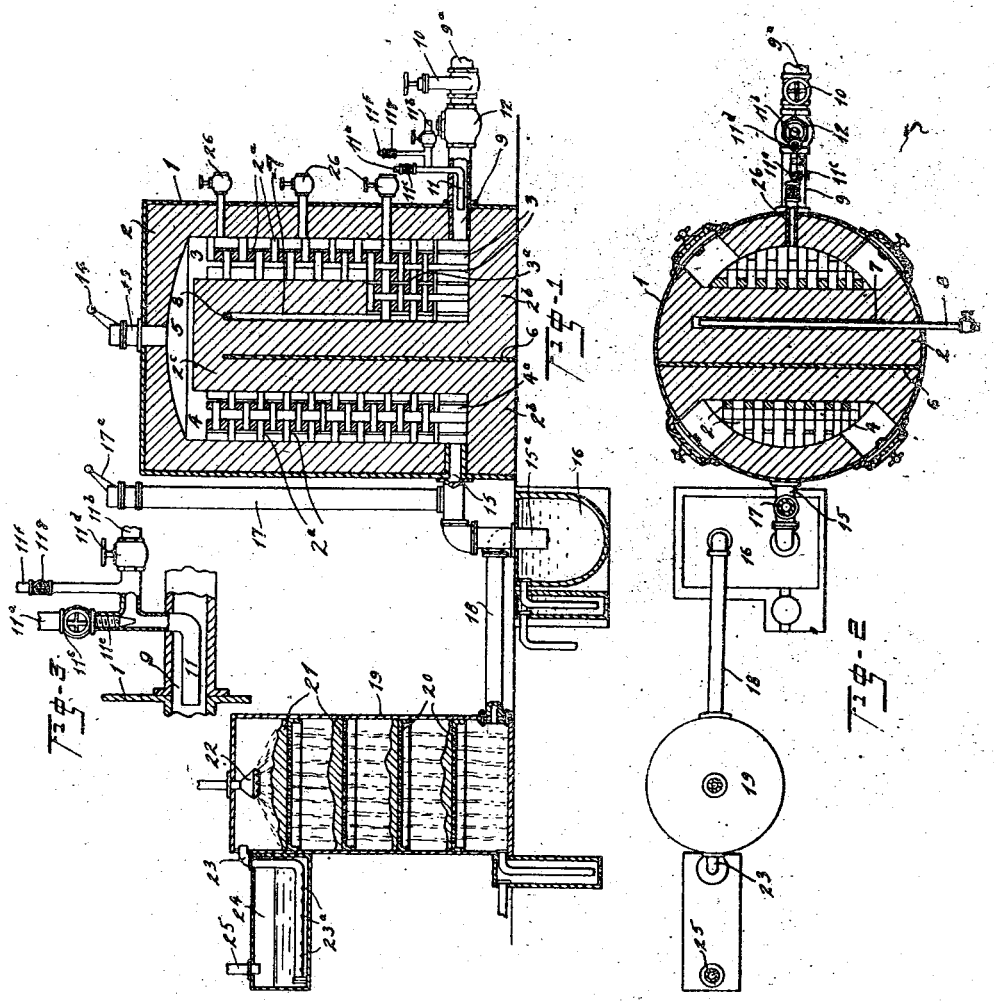

Patented May 10, 1927.

1,628,067

UNITED STATES PATENT OFFICE.

JAMES R. ROSE, OF EDGEWORTH, PENNSYLVANIA, ASSIGNOR TO CARBO-HYDROGEN COMPANY OF AMERICA, OF PITTSBURGH, PENNSYLVANIA, A CORPORATION OF DELAWARE.

GASEOUS FUEL.

Application filed December 31, 1919. Serial No. 348,679.

This invention relates to gaseous fuel and more particularly to the production of gaseous fuel to which I have applied the name "Carbo-hydrogen" and which is particularly adapted for use in connection with the cutting and welding of iron and steel and various alloys thereof and for the heating of large plates or masses of metal for the purposes of shaping the same.

It is the general object of the invention to produce a gaseous fuel which will be of high heating value but which will require for its combustion a minimum quantity of oxygen, whereby cutting, for instance, may be accomplished with a great saving in the expense of the oxygen required as compared with that required for the combustion of acetylene, with an efficiency at least equal to that obtained by the use of acetylene and other gases requiring for their combustion a large amount of oxygen.

As is well known, ordinary illuminating gas has approximately the following composition by volume:

| | Per cent. |
|---|---|
| Hydrogen | 45 |
| Carbon monoxide | 40 |
| Hydrocarbons of the general formula $C_nH_{n+2}$ | 15 |

Also, as is well known, natural gas is principally methane, having the formula $CH_4$. While either the artificial or the natural gas may be used for cutting or welding purposes, the relatively high proportion of the carbon constituent in either of these gases required for its combustion a large proportion of oxygen, making the use of such gases for cutting or welding purposes very expensive.

The gas which forms the subject matter of this application is a gas containing hydrogen and hydrocarbons of high heating value and which is fixed under the conditions surrounding its commercial use, being capable of compression and storage in tanks or cylinders without separation under a pressure of from 2000 to 2200 lbs. per square inch.

In producing the gas, natural gas or oil is conducted through a retort or generator having a lining of refractory material, such as the ordinary silica brick of commerce, the said gas or oil and an additional hydrocarbon fluid being subjected to such heated refractory lining. Where the lining is maintained at a temperature of about 2200° F. and oil or other liquid hydrocarbon is used, the resultant gas will contain under ordinary temperature and tank pressures approximately 83% of hydrogen, 13 to 14% of a gas of the $CH_4$ series, and approximately 3% of unsaturated hydrocarbons and other gases. By increasing the temperature of the refractory lining, the proportion of hydrogen will be increased and the proportion of the other constituents will be decreased until, at about 3000° F., the resultant gas will contain hydrogen in approximately the proportion of 98% to 2% of the other constituents. By decreasing the temperature below 2200° F., a smaller proportion of hydrogen and a larger proportion of the other ingredients will be produced. A proportion of hydrogen less than 80 per cent and of other gaseous constituents in excess of 20 per cent in the final gas would render the same unacceptable to the trade in most instances, because of the large amount of oxygen required for the combustion of the hydrocarbon constituents thereof. The gas such as is produced at a temperature of 2200° F. and having substantially the proportions of hydrogen and other constituents set forth is particularly efficient for cutting and welding with oxygen and is the gas referred to hereinbefore and sold to the trade under the name of "Carbo-hydrogen". The gas having the higher proportion of hydrogen and the lower proportion of other gaseous constituents produced at the temperature of about 3000° F. is particularly useful for burning lead.

In the drawing forming a part hereof I have illustrated a form of apparatus which is particularly well adapted for producing the gas referred to hereinbefore, the apparatus forming the subject matter of my Patent No. 1,254,360, issued January 22, 1918, of which patent this application is a continuation in part. In these drawings Fig. 1 is a longitudinal vertical sectional view through an apparatus capable of realizing the process of producing my gaseous fuel, said section being taken through the central portion of the generator, one side of the trap and the central portions of the scrubbing and enriching tanks; Fig. 2 is a view, partly in horizontal section and partly in plan, of the apparatus shown in Fig. 1, the section being taken just above the pipe 8; and Fig. 3 is an enlarged detail, partly in vertical section and partly in elevation, of the connections for supplying fluids to the bottom of the apparatus.

Describing by reference characters the various parts illustrated in the drawings, 1 denotes the outer shell and 2 the refractory lining and filler of a gas generator, which generator is shown as cylindrical. This refractory lining and filler may be of any suitable well known material, such as the ordinary silica brick of commerce, and the generator is so constructed as to provide a front flue 3 and a rear flue 4 communicating at their upper ends by a transverse passageway 5. Refractory material $2^a$ is arranged in "checker-work" formation within the flues 3 and 4 as well as in a chamber $3^a$ projecting from the bottom of the flue 3, said chamber being adapted to receive an enriching fluid in a manner to be described hereinafter.

It will be observed that the bottoms of the flues 3 and 4 and the chamber $3^a$ are located a distance above the bottom of the generator body, whereby an ample thickness of refractory material $2^a$ is provided below such chambers.

6 denotes a partition, preferably of sheet steel, extending transversely across the generator between the flue 3 and the chamber $3^a$ and the flue 4 and extending from the bottom of the generator upwardly to a distance below the top of the refractory dividing wall $2^c$. This partition prevents seepage of gases from the flue on one side thereof to the flue on the opposite side thereof. 7 denotes a chamber extending upwardly from the inner or rear end of the chamber $3^a$, preferably substantially as high as the partition 6, and having in the upper portion thereof a spray pipe 8.

9 denotes an inlet connection pipe communicating with the front or charging wall of the generator 1 and discharging into the bottom of the flue 3. This connection is provided at its outer end with a gate valve 10 and is extended, as indicated at $9^a$, to a suitable air blower (not shown). 11 denotes a nozzle through which a suitable preheating fluid (such as gas, or liquid hydrocarbon) mixed with air (if desired) may be introduced into the bottom of the flue 3. This nozzle preferably extends axially into the connection 9 and is adapted to receive gaseous and liquid fuel from the pipes $11^a$, $11^b$, respectively, each having a valve, indicated at $11^c$, $11^d$, respectively, there being an injector nozzle $11^e$ within the pipe $11^a$ in operative relation to the lateral branch extending from said pipe and to which the pipes $11^b$ and $11^f$ are connected whereby, if desired the gas which is supplied through the pipe $11^a$ may be used in cooperation with either of the fluids supplied through the pipes $11^b$ and $11^f$ and, in the case of oil, assist in injecting the same.

The flues 3 and 4 and the chamber $3^a$ are provided with a checker work filling of refractory material referred to hereinbefore and indicated at $2^a$, while the transverse passageway 5 is provided with an outlet connection 13 having a weighted blow-off or pressure-relief valve therein, the operating handle whereof is indicated at 14.

From the arch $4^a$ at the bottom of the flue 4 there extends an outlet flue 15, the discharge pipe of which projects into a vessel 16, the lower end $15^a$ of such pipe being sealed by suitable liquid within the receptacle. Projecting upwardly from the outlet flue 15 is a pipe 17 having a pressure-relief valve therein similar to the valve in the pipe 13, the operating handle of the valve being indicated at $17^a$.

From the top of the receptacle 16 and having its inlet end above the liquid therein extends a pipe 18, which communicates with the bottom of the scrubbing tank 19, having a series of transverse, perforated partitions therein with suitable porous material 21 on said partitions and a spraying nozzle 22 in the upper end thereof above the uppermost partition and the material thereon. From this scrubber a pipe 23 extends into a tank 24 which may contain a hydrocarbon liquid of a high or rich series, the pipe 23 being provided with perforations $23^a$ beneath the top of the liquid in said tank whereby the gas discharged from the scrubber may be further enriched. From the enriching tank 24 a pipe 25 leads to a storage tank or to the point of use. From the front of the generator 1, there project pipes or connections 26 which provide means for applying pyrometers to the chamber 3 or for the application of instruments for estimating the temperature by observation, as by a color test.

In operation, gas (artificial or natural) or liquid hydrocarbon (such as crude or refined oil) is introduced into the bottom of the flue 3 and chamber $3^a$ from the pipe $11^a$ or the pipe $11^b$, respectively. In the case of gas, the gas will be introduced under the ordinary city or tank pressure; in the case of oil, the fuel will be pumped or sprayed into the bottom of the chamber; in either case, the hydrocarbon fuel is mixed with air; where air is used it is preferably supplied through the pipe $9^a$. This mixture of hydrocarbon and air, being ignited, burns in contact with the refractory material 2 in the front and rear flues until the desired temperature is attained, as indicated by the pyrometers or sight tubes. The products of combustion resulting from this preheating operation will escape through the upper end of the pipe 17, the valve being opened or lifted by its handle 17 for the purpose of facilitating the discharge of such gases.

After the "blowing-up" or preheating operation, the fluid which is to be broken up and otherwise changed (preferably natural gas) will be introduced into the bottom of the front chamber through the pipe 11$^f$, said pipe being provided with the valve 11$^g$. This fluid, coming into contact with the preheated refractory material, will, in its long and tortuous passage through the heated zone thus provided be partly dissociated into carbon and hydrogen. In order to enrich the gas thus produced, a liquid hydrocarbon, preferably of higher gravity in degrees Baumé than that introduced into the bottom of the flue 3 and the chamber 3$^a$, will now be sprayed into the chamber 7 through the pipe 8. This hydrocarbon will be partly dissociated in the chamber 7, it being noted that the chamber 7 is within the refractory filler and in such proximity to the flues 3 and 4 as to be heated thereby. Some of the solid carbon which will be produced will be carried through the generator and deposited in the trap 16. A large proportion of such solid carbon will, however, be deposited upon the refractory material 2 and will be consumed during the next blowing-up or preheating operation, thus utilizing its heat of combustion in the production of the enriched gas in the generator.

Through the dissociation of the gas introduced through the nozzle 11, hydrogen in a nascent condition will be produced, along with carbon monoxide. This dissociation will ordinarily occur within the first eighteen inches of the vertical movement of the fluids in the chamber 3$^a$ and flue 3. On the other hand, the hydrocarbon introduced through the pipe 8 will be gradually broken up or dissociated as it descends the chamber and transverses the chamber and flue 2. In its passage through the flues 3, 6 and 4, it will, through the high temperature to which it is subjected in the said refractory-lined passageway of the generator be further dissociated and combined with the fluid introduced through the nozzle 11. The final result of the dissociation and combination in the generator under the conditions hereinbefore set forth will result in the production of a gas, which is fixed under all ordinary temperatures and under a pressure of from 2000 to 2200 lbs. per square inch and having a higher hydrogen content and requiring far less oxygen for its combustion than the fluid which was introduced through the nozzle 11. Where natural gas is the gas or fluid introduced through the nozzle 11 after the preheating operation and where crude oils are employed for the liquid fuel discharged into the flue 7 through the pipe 8, there will result, from the dissociation and combination which takes place in the generator under the influence of the heat retained in the checker work refractory filling and the heat resulting from the combustion of the carbon deposited on such filling, a gas which, when the lining is at substantially the temperature of 2200° F., will contain approximately 83% hydrogen and 13 to 14% of a gas of the CH$_4$ series, the remainder consisting of unsaturated hydrocarbons, oxygen, and carbon monoxide.

The gas thus produced in the generator 1 will be conducted through the trap 16, which will trap any solid carbon that may be present, and will then be conducted through the conductor coil 19, as explained heretofore, and may, if to be further enriched, if desired, by being discharged into and through the by-pass 23 into the enriching tank 24.

This hydrocarbon liquid in the tank 24 may be benzene or any other volatile hydrocarbon of a sufficiently high series, and the resultant fluid will not separate or stratify when stored under pressure.

At the end of the operation, because of the dissociation of the hydrocarbon supplied through the nozzle 11 and pipe 8 a considerable quantity of solid carbon will be deposited upon the refractory material with which the generator chambers are supplied. This will furnish a material part of the combustible agent whereby the refractory material will be heated during the next "blowing-up" operation.

In the practice of the process, the refractory material 2 eliminates from the gaseous and liquid fuels subjected thereto a large amount of carbon which is not only an unnecessary, but an undesirable, constituent of gases employed for cutting or welding purposes, because carbon requires for its consumption a large amount of oxygen and thus oxygen is not the oxygen present as an ingredient of the gas but the commercially pure and expensive oxygen employed in the cutting and welding.

Where the temperature in the generator is about 2200° F. and oil or the higher hydrocarbons are employed, the resultant gas will contain about 85 percent hydrogen and 15% of a hydrocarbon gas or gases formed by the decomposition of such liquid hydrocarbon. Where the temperature is about 3000° F., the resultant gas contains about 98% hydrogen and 2% of gas or gases produced by the decomposition of the liquid hydrocarbon or hydrocarbons. If a lower temperature level than 2200° F. be employed, a smaller proportion of hydrogen and a larger proportion of the gas formed by the decomposition of the hydrocarbon or hydrocarbons will be produced.

In actual practice I have superimposed on barrel (fifty gallons) of forty degrees Baumé gravity oil per hour through the pipe 8 and have supplied natural gas to the generator at the rate of thirty cubic feet per minute and as a result have produced the gaseous fuel, "carbo-hydrogen" at the rate of one hundred sixty cubic feet per minute.

While, as stated hereinbefore, the proportions of hydrogen and the gas produced by the decomposition of the hydrocarbon or hydrocarbons will vary in accordance with the temperature in the generator, the best results in the cutting and welding art have been hereto produced by limiting the proportion of the hydrogen constituent between 80% and 98%, with a corresponding limitation in the gas produced by the decomposition of the hydrocarbon or hydrocarbons of from 20% to 2%.

An analysis of a sample of my gas taken from one of the regular cylinders indicated the following composition by volume:

|  | Per cent |
|---|---|
| Unsaturated hydrocarbons | 1.0 |
| Oxygen | 0.3 |
| Carbon monoxide | 1.7 |
| Methane | 13.7 |
| Hydrogen | 82.9 |
| Undetermined | 0.4 |

Another sample of gas from the same cylinder was then chilled to minus 158° F. As a result of this chilling .12 of a grain or 1.85 grains per cubic foot of light liquid was separated, said liquid boiling between 80° F. and 140° F. and consisting of a trace of unsaturated hydrocarbons, butane, pentane, and a trace of benzol. The gas remaining after the separation of the liquid was analyzed, indicating the following composition by volume:

|  | Per cent. |
|---|---|
| Unsaturated hydrocarbons | .6 |
| Oxygen | .3 |
| Carbon monoxide | 1.7 |
| Methane | 13.4 |
| Hydrogen | 82.9 |
| Undermined | 1.1 |

The sample of gas was then passed into liquid air after having been chilled to minus 73° C. At the temperature of liquid air, approximately minus 183° C., there was a further separation of liquid. Upon analysis, this liquid proved to be similar in composition to the unliquefied gas with the exception that the percentage of higher hydrocarbons was increased and hydrogen was not liquefied; 1½% of material reported in the earlier analysis as methane consisted of higher hydrocarbons, chiefly propane and butane.

While the proportion of carbon monoxide and oxygen in the final gas is small, nevertheless the presence of these gases is extremely desirable in the ultimate gas. The carbon monoxide imparts visibility to the inner cone of the blow-pipe flame, enabling the flame to be quickly and effectively applied to the article to be cut or welded. The oxygen constituent is diffused throughout the gaseous mixture and therefore not only reduces the amount of oxygen necessary for the combustion of the other constituents but operates with maximum efficiency in assisting in the combustion thereof.

This application is in some respects a continuation in part of my application No. 185,978 filed August 13, 1917, as well as of my Patent No. 1,254,360.

Having thus described my invention, what I claim is:—

1. A combustible welding and cutting gas especially useful with oxygen in metal cutting, welding and the like, consisting essentially of from 80% to 98% of hydrogen and from 20% to 2% of other gases, such other gases consisting principally of methane and including a small proportion of propane and butane.

2. A combustible welding and cutting gas especially useful with oxygen in metal cutting, welding and the like, consisting essentially of from 80% to 98% of hydrogen and from 20% to 2% of other gases, such other gases consisting principally of methane and including a small proportion of propane, butane, carbon monoxide and oxygen.

In testimony whereof, I hereunto affix my signature.

JAMES R. ROSE.